United States Patent [19]

Narita

[11] Patent Number: 4,970,916
[45] Date of Patent: Nov. 20, 1990

[54] SHIFT CONTROL SYSTEM FOR AUTOMATIC TRANSMISSION

[75] Inventor: Yasushi Narita, Yokohama, Japan

[73] Assignee: Nissan Motor Company Limited, Yokohama, Japan

[21] Appl. No.: 330,129

[22] Filed: Mar. 29, 1989

[30] Foreign Application Priority Data

Mar. 29, 1988 [JP] Japan .................... 63-73460

[51] Int. Cl.[5] ............................. B60K 41/06
[52] U.S. Cl. .................... 74/866; 364/424.1
[58] Field of Search ............... 74/866; 364/424.1

[56] References Cited

U.S. PATENT DOCUMENTS

| | | | |
|---|---|---|---|
| 4,473,882 | 9/1984 | Suzaki et al. | 364/424.1 |
| 4,527,678 | 7/1985 | Pierre et al. | 74/866 X |
| 4,665,777 | 5/1987 | Kikuchi et al. | 74/866 |
| 4,680,992 | 7/1987 | Hayasaki et al. | 74/869 |
| 4,691,597 | 9/1987 | Leorat et al. | 74/866 X |
| 4,698,763 | 10/1987 | Smyth | 74/866 X |
| 4,703,519 | 3/1988 | Nakamura et al. | 74/866 |
| 4,730,520 | 3/1988 | Nishikawa et al. | 74/866 |
| 4,848,529 | 7/1989 | Kurihara et al. | 74/866 X |

FOREIGN PATENT DOCUMENTS 63-135636 6/1988 Japan.

OTHER PUBLICATIONS

Nissan Service Manual, 1987, pp. 1–90.

Primary Examiner—Dwight Diehl
Attorney, Agent, or Firm—Foley & Lardner, Schwartz, Jeffery, Schwaab, Mack, Blumenthal & Evans

[57] ABSTRACT

The states of two solenoids which control four forward gears of a transmission, are toggled between ON and OFF states in response to the outcome of a comparative ranging of a ratio with limits derived from pre-recorded data. In the case of a power ON upshift data which is recorded in terms of throttle opening is used. On the other hand, when a power OFF upshift is induced by releasing the vehicle accelerator pedal, data which is recorded in terms of vehicle speed is used to set the limits.

6 Claims, 9 Drawing Sheets

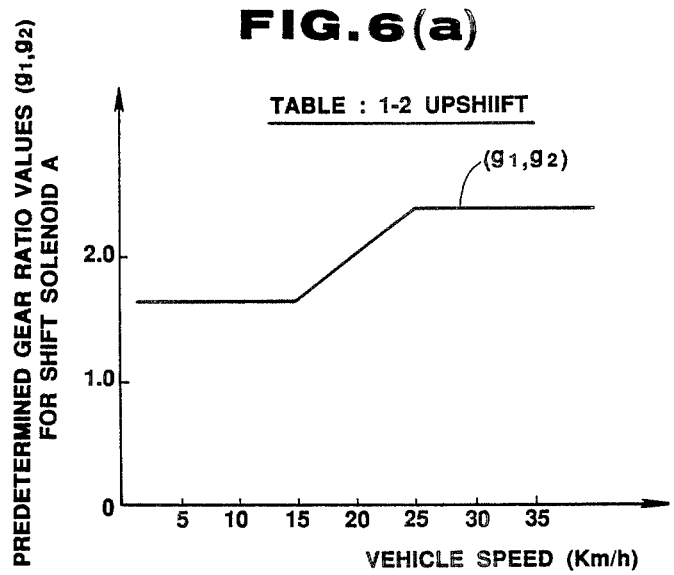
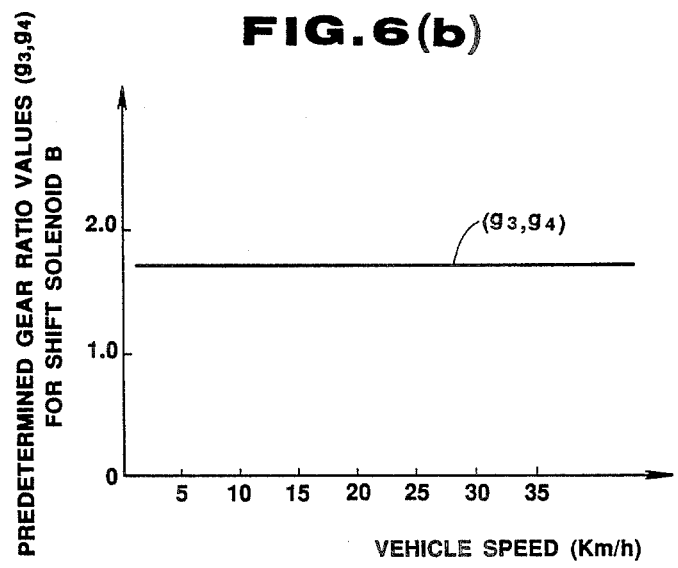

SHIFT CONTROL SYSTEM FOR AUTOMATIC TRANSMISSION

BACKGROUND OF THE INVENTION

1. Field of the Invention

The present invention relates generally to automatic transmissions and more specifically to a control arrangement therefore which improves upshifting particularly during "power off" modes of engine operation when the engine is not induced to produce torque.

2. Description of the Prior Art

When an engine switches to a power off mode of operation, as shown in the shift pattern illustrated in FIG. 8 (note that only the upshift lines are shown), in response to the engine throttle valve closing from a level equal to or higher than point X, to a level denoted by Y, with the vehicle running at a given vehicle speed, the 1-2 shift line is crossed and the transmission is conditioned to undergo a corresponding upshift.

In response to the closure of the throttle valve, the idle switch is closed and for a predetermined period of time following this event, depending on the gear ratio developed by the gears which are operatively engaged, the rotational speed of the input and output shafts do not synchronize. This asynchronization results in a backlash being produced in the differential gear. This of course causes both noise and a jerking of the vehicle.

In order to overcome this drawback a less preferred transmission control embodiment (disclosed in Japanese Patent Application No. 61-282252 filed by the same entity as the instant application is assigned) has been proposed.

With this arrangement, as indicated in FIG. 9, when the driver releases the accelerator pedal in a manner which permits the throttle to close from a fully open or near fully open position, to a fully closed one, at the time point t1 a decision to implement a 1-2 upshift is produced is response to the throttle valve assuming a fully closed position and triggering an idle switch which is associated therewith.

Following the issuance of this signal, the engine speed NE and the rotational speed of the torque converter output element NT reduce. For the sake of explanation let it be assumed that the gear ratio which will be produced by the second speed gearing is 1.619, whereby the rotational speed NO of the transmission output shaft will become NT×1.619.

However, at this time the transmission is still conditioned to produce first gear ratio the current rotational speed ratio G=NT/NO As shown, this value decreases.

When G=g1 (g1=a predetermined value) such as indicated at time t2 in this figure, a shift solenoid A is de-energized (conditioned to assume an OFF state) and the second speed engagement pressure permitted to build-up in the appropriate friction elements and condition the transmission to produce second speed.

This control induces the situation wherein the input and output rotational speeds NT, NO become essentially equal during the initial stages of the second speed engagement and the illustrated smooth transmission output torque characteristics are derived. These characteristics of course are such that the above mentioned backlash and associated problems do not occur.

However, this arrangement has suffered from the drawback that the above timing control is suited to controlling a power off type 1-2 upshift only in a narrow vehicle speed range, and as the vehicle speed deviates from this range, the above described input and output shaft rotational speed synchronization cannot be achieved at the desired timing with respect to the second speed engagement operation and considerable shift shock tends to be generated under such conditions.

SUMMARY OF THE INVENTION

It is an object of the present invention to provide a shift control of the nature mentioned above and which features vehicle speed responsive characteristics when the transmission undergoes a power OFF upshift.

In brief, the above object is achieved by an arrangement wherein the states of two solenoids which control four forward gears of a transmission, are toggled beteen ON and OFF states in response to the outcome of a comparative ranging of a ratio developed by comparing with the rotational speeds of the input and output gears, with limits derived from pre-recorded data. In the case of a power ON upshift, data which is recorded in terms of throttle opening is used. On the other hand, when a power OFF upshift is induced by releasing the vehicle accelerator pedal, data which is recorded in terms of vehicle speed is used to set the limits.

More specifically, a first aspect of the present invention is deemed to comprise an automatic transmission which features: first and second shift control solenoids; first and second rotational speed sensors for sensing the rotational speed of an input and an output shaft of the transmission; a memory in which data is recorded, the data including a schedule which is recorded in terms of a parameter indicative of vehicle speed and gear ratio limits; and means for: comparing the input and output rotational speeds and developing a ratio; comparing the ratio with first and second gear ratio limits for the first shift control solenoid; comparing the ratio with third and fourth limits for the second shift control solenoid; setting the solenoid energization status of the first solenoid in accordance with the comparison of the ratio with the first and second limits; and setting the solenoid energization status of the second solenoid in accordance with the comparison of the ratio with the third and fourth limits.

A second aspect of the present invention is deemed to comprise a vehicle which features: a vehicle speed sensor; an engine having a throttle valve; a throttle valve; a power train, the power train being operatively connected between the engine and the driving wheels of the vehicle, the power train including a transmission comprising: an input shaft and an output shaft; first and second rotational speed sensors for sensing the rotational speeds of the input and output shafts, respectively; a gear train control valve unit, the control valve unit having first and second solenoids, the solenoids each having an ON and an OFF state; control schedules for each of the first and second solenoids recorded in terms of gear ratio limits and vehicle speed; a shift control unit, the shift control unit being operatively connected with the control valve unit in a manner to control the first and second solenoids, the shift control unit being responsive to the vehicle speed sensor, the throttle valve sensor, and the first and second rotational speed sensors, the shift control unit including a memory in which the control schedules are stored, the shift control unit including circuit means for deriving a rotational speed ratio based on the inputs from the first and second rotational speed sensors and comparing the derived rotational speed ratio with the gear ratio limits which are read out of the memory based on the input from the vehicle speed sensor, the shift control unit being arranged to selectively switch the first and second solenoids ON and OFF in accordance with the outcome of the comparison of the ratio with the gear ratio limits.

A third aspect of the present invention is deemed to comprise a vehicle which features: a vehicle speed sensor; an engine, the engine having a throttle valve; a throttle position sensor for sensing the position of the throttle valve; an idle switch for sensing the closure of the throttle valve; a power train, the power train being operatively connected between the engine and the driving wheels of the vehicle, the power train including a transmission comprising: an input shaft and an output shaft; first and second rotational speed sensors for sensing the rotational speeds of the input and output shafts, respectively; a gear train control valve unit, the control valve unit having first and second solenoids, the solenoids each having an ON and an OFF state; a shift control unit, the shift control unit being operatively connected with the control valve unit in a manner to control the first and second solenoids, the shift control unit being responsive to the vehicle speed sensor, the throttle valve sensor, the idle switch and the first and second rotational speed sensors, the shift control unit including a memory in which a plurality of control schedules for each of the first and second solenoids is recorded in terms of gear ratio limits and throttle opening degree and gear ratio limits and vehicle speed, the shift control unit including circuit means for deriving a rotational speed ratio based on the inputs from the first and second rotational speed sensors and comparing the derived rotational speed ratio with the gear ratio limits which are read out of the memory based on the input from the vehicle speed sensor, the shift control unit being arranged to selectively switch the first and second solenoids ON and OFF in accordance with the outcome of the comparison of the ratio with the gear ratio limits.

BRIEF DESCRIPTION OF THE DRAWINGS

FIG. 6(a) and 6(b) are charts which show in terms of gear ratio and vehicle speed, control schedules which are used to determine the operation of solenoids incorporated in the transmission control system;

DETAILED DESCRIPTION OF THE PREFERRED EMBODIMENTS

Figure 1:
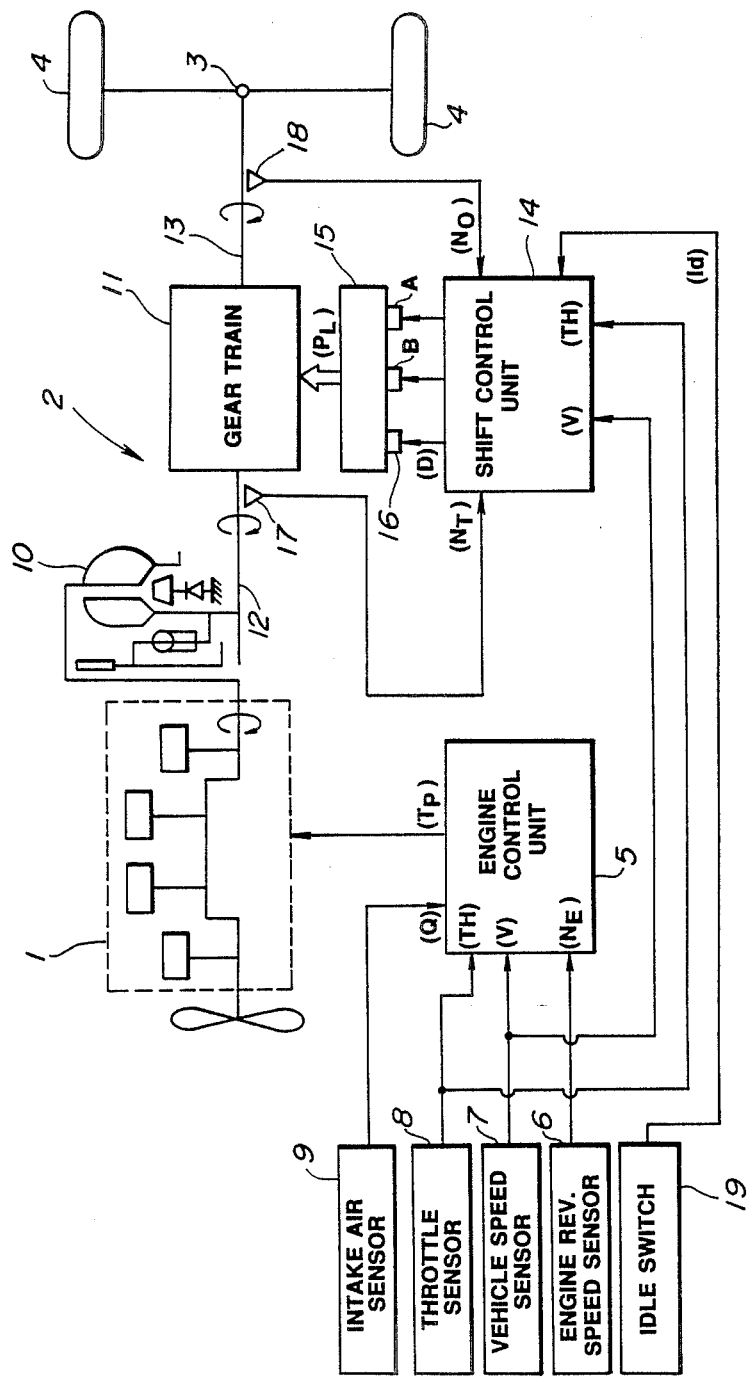
FIG. 1 shows in schematic and block diagram form, an engine/transmission power train to which the present invention is applied.

FIG. 1 shows a power train to which an embodiment of the present invention is applied. In this arrangement an electronically fuel injected internal combustion engine 1 is operatively connected by way of a power train (generally denoted by the numeral 2) with a differential gear 3. Driving wheels 4 are connected to the differential 3.

It should be understood that even though FIG. 1 shows a F-R power train (front engine-rear wheel drive) the present invention is not limited to the same and can be applied to FF or MR type arrangement if so desired.

The engine control system includes an engine control unit 5 which is supplied inputs from an engine speed sensor 6, a vehicle speed sensor 7, a throttle position sensor 8, and an intake air sensor 9.

Based on the inputs of sensors 6 to 9, the control unit 5 which in this instance includes a microprocessor (not show), derives the appropriate injection control pulse width and applies the same to the fuel supply system of the engine.

In this embodiment, the power train 2 includes a RE4RO1A type transmission developed by NISSAN MOTOR CO. LTD., the construction and arrangement of which is described in detail in the Service Manual A261CO7 published by the above mentioned company.

A torque converter 10 including a lock-up clutch provides an operative connection between the output shaft of the engine and an input shaft 12 of a gear train 11. A transmission output shaft 13 provides a drive connection between the differential or final gear 3 and the transmission.

The system includes a shift control unit 14 which also includes a microprocessor. This unit 14 is arranged to issue control signals to a control valve unit 15 which forms part of the transmission. The control valve unit 15 includes three solenoids A, B and D.

In this embodiment the transmission includes a gear train comprising a plurality of planetary gear units, and associated hydraulically operated clutches and brakes (not shown). The brakes and clutches are operated by the supply of so called "line pressure" PL which is selectively supplied from the control valve unit 15.

Depending on the energization of solenoids A and B, the transmission is conditioned to selectively produce a number of different gear ratios by selectively inducing line pressure PL to be supplied to the appropriate friction elements.

In this instant arrangement four forward gear ratios of the transmission can be produced in the manner indicated in the table below.

TABLE

| GEAR: | FIRST | SECOND | THIRD | FOURTH |
|---|---|---|---|---|
| SOL. A: | ON | OFF | OFF | ON |
| SOL. B: | ON | ON | OFF | OFF |

The third solenoid D of the control valve unit 15 is arranged to be operated on a variable duty cycle and to control the level of the line pressure PL. With this arrangement as the duty cycle increases the level of the line pressure is increased.

The shift control unit 14 is arranged to receive data inputs NT and NO from rotational speed sensors 17 and 18 respectively. As will be appreciated from the drawings, NT is indicative of the rotational speed of the input shaft 12 of the transmission while NO is indicative of the rotational speed of the transmission output shaft 13.

It is worth noting that the output of the sensor 18 can be used additionally as a vehicle speed indicative signal if so desired.

This unit 14 further receives data inputs V, TH and Id from the vehicle speed sensor 7, the throttle position sensor 8 and an idle switch 19.

Figure 2:
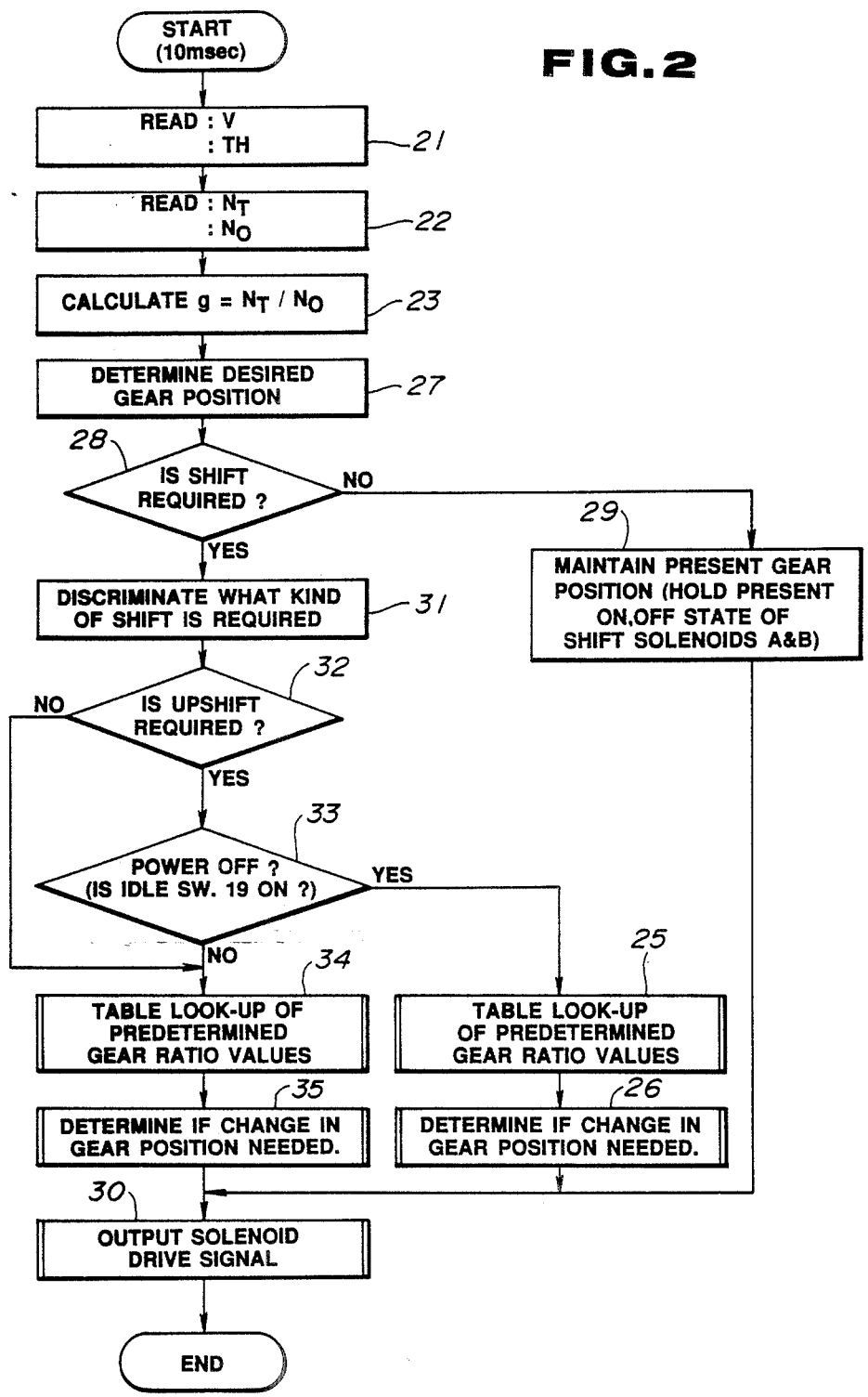
FIGS. 2 to 4 are flow charts which shows control routines which are run in accordance with the embodiment of the present invention.
Figure 3:
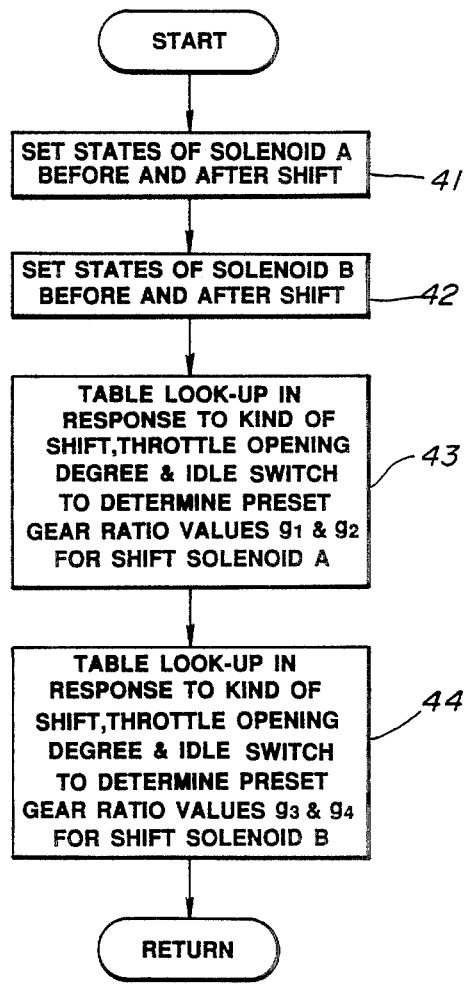
Figure 4:
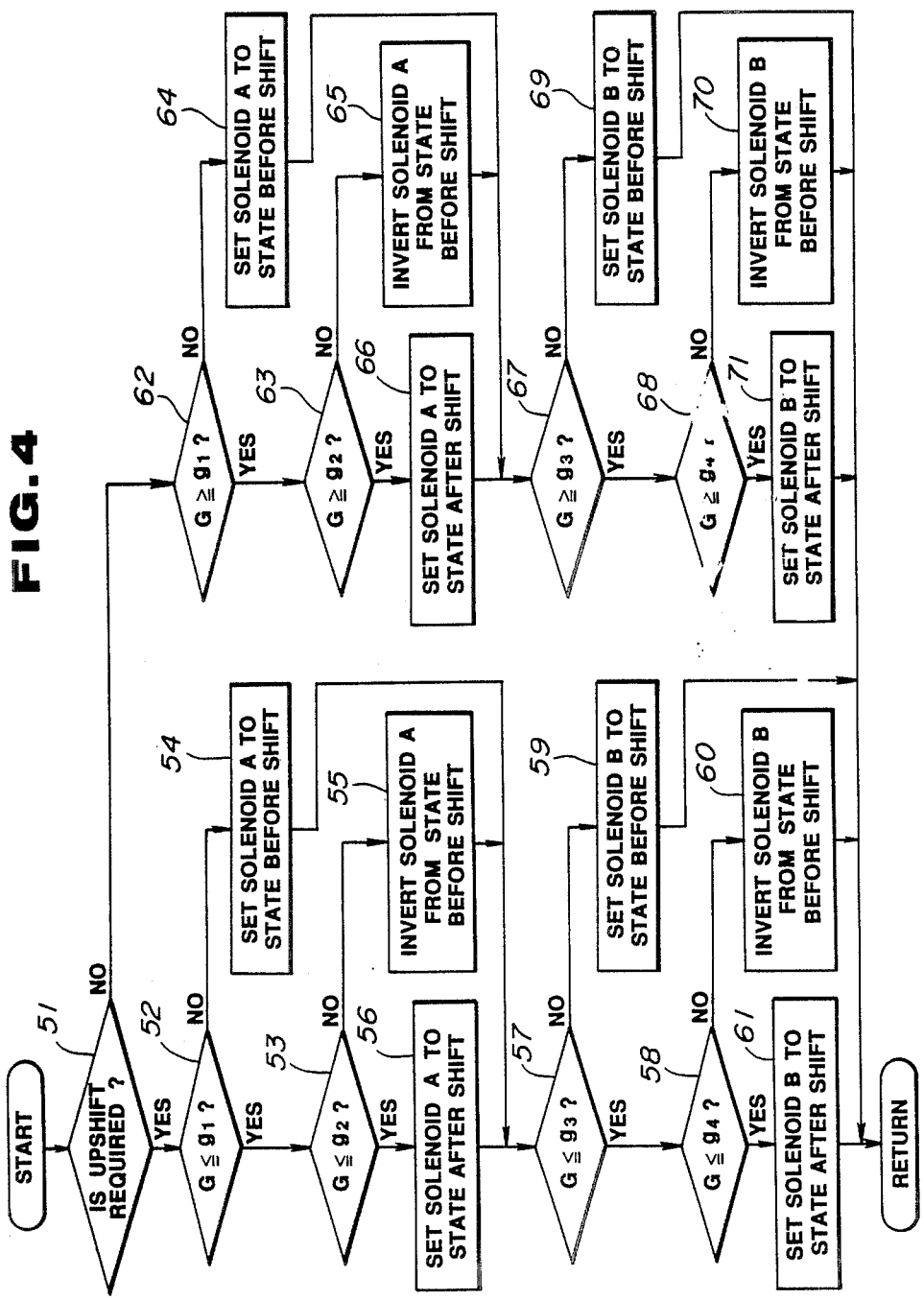

Programs of the nature depicted in the flow charts of FIGS. 2 to 4 are run in the shift control unit microprocessor in order to derive the appropriate control signals. In this embodiment the main control routine shown in FIG. 2 is arranged to be run at 10 msec intervals (by way of example).

Figure 8:
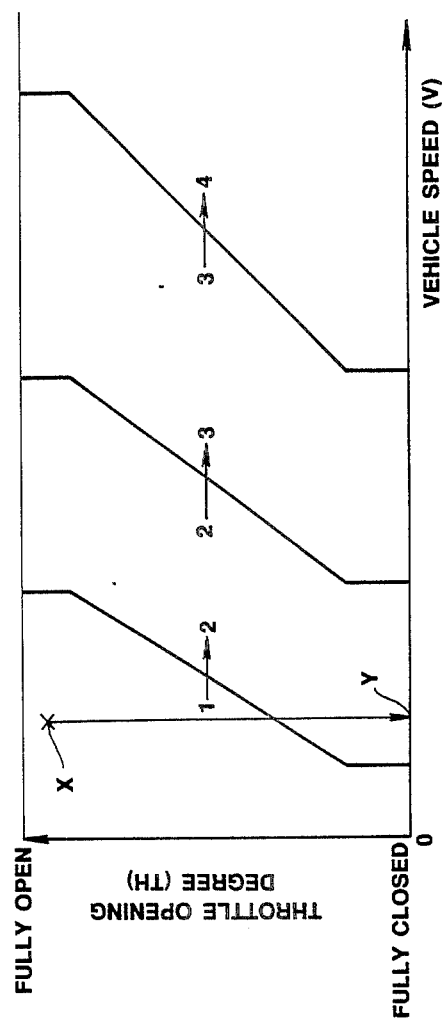
FIG. 8 shows in terms of throttle opening and vehicle speed, the shift pattern referred to in connection with the prior art in the opening paragraphs of the instant disclosure.
Figure 9:
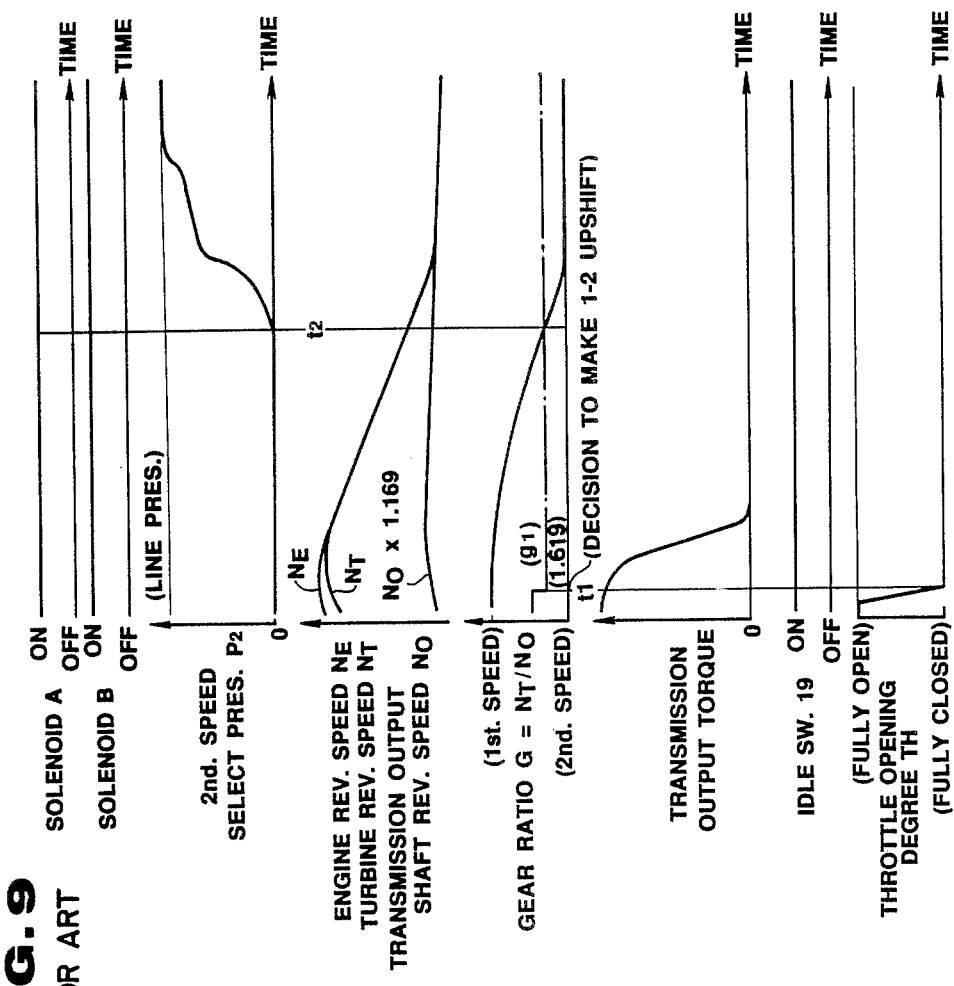
FIG. 9 is a timing chart referred to in connection with the prior proposed shift control arrangement described in JP-A-61-282252.

The first two steps 21, 22 of the main control routine are such at to read the vehicle speed, throttle setting, input and output shaft rotational speed data, and to set the same in memory ready for further processing. At step 23 the instant rotational speed ratio occurring between the input and output shafts 12, 13 of the transmission G (G=NT/NO) is derived and at step 27 tabled data of the nature shown in FIG. 8 (note that the downshift lines per se are not actually shown in this figure) is used to determined the most appropriate gear position for the instant set of vehicle speed (V) and engine load (TH) conditions.

At step 28 the speed gear ratio the transmission is currently conditioned to produce is compared with that determined in step 27. In the case that the instant speed gear meets the instant V and TH requirements, an indication that no speed gear shift is necessary, is issued, and the routine flows to step 29. In this step commands are generated which hold the shift control solenoids A and B in their present condition or energization states and thus maintains the transmission in its instant state without shifting.

The routine then flows directly to step 30 wherein the commands generated in step 29 are implemented.

On the other hand, if the outcome of the comparison in step 28 is such as to indicate that the instant speed gear ratio does not meet the instant set of V and TH requirements, then the routine flow to step 31. In this step it is determined in which direction and to what degree the shift must be made. Viz., it is determined if the transmission should be upshifted or downshifted from the gear the transmission is currently conditioned to produce, and to which gear the shift should be made.

At step 32 it is determined if the outcome of the discrimination executed in step 31 indicates the need for an upshift or not. In the case of a positive outcome, the routine flows to step 33 wherein the status of the idle switch 19 is sampled. While the idle switch is not closed, indicating that the throttle valve has not assumed a fully closed position and that a power OFF condition has not yet been established, the routine flows to step 34.

Steps 34 and 35 are such as to execute normal "power ON" transmission control. In this instance, the sub-routine shown in FIG. 3 is run in step 34. The first steps 41 and 42 of this sub-routine are such as to determine the states of the solenoids A and B should exhibit before and after a given shift. These values are set in memory ready for selection in accordance with the running of a sub-routine which will be disclosed later in connection with the flow chart of FIG. 4.

Figure 5A:
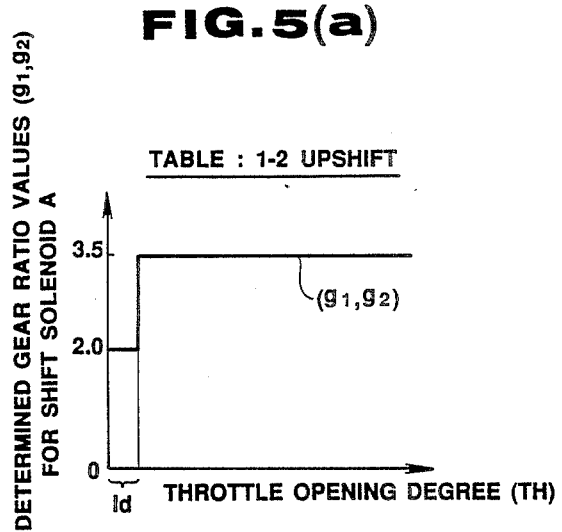
FIGS. 5(a) and 5(b) are charts which show in terms of gear ratio and throttle opening, control schedules which are used to determine the operation of solenoids incorporated in the transmission control system, during a 1–2 upshift.
Figure 5B:
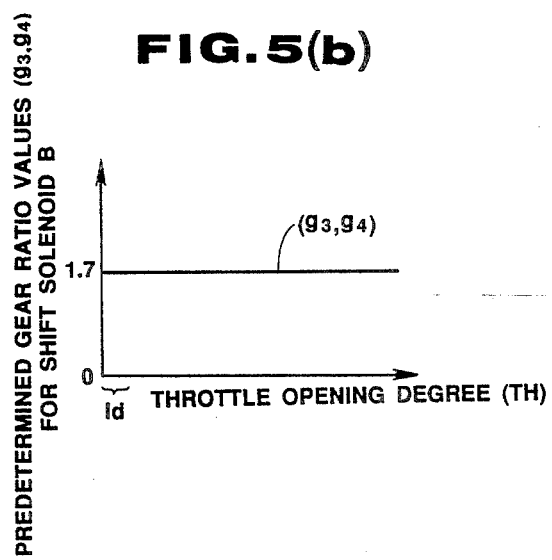
Figure 7A:
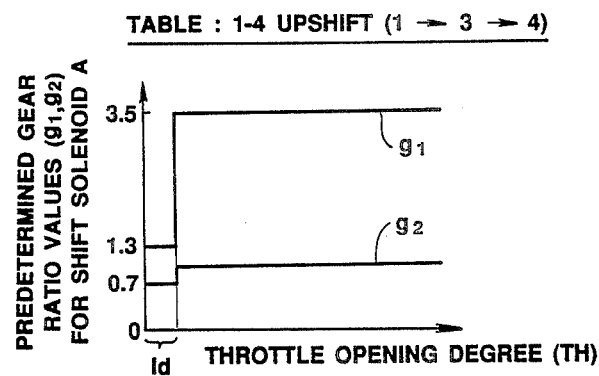
FIGS. 7(a) and 7(b) are charts which show in terms of gear ratio and throttle opening, further control schedules which are used to control the operation of solenoids incorporated in the transmission control system during a 1–4 upshift.
Figure 7B:
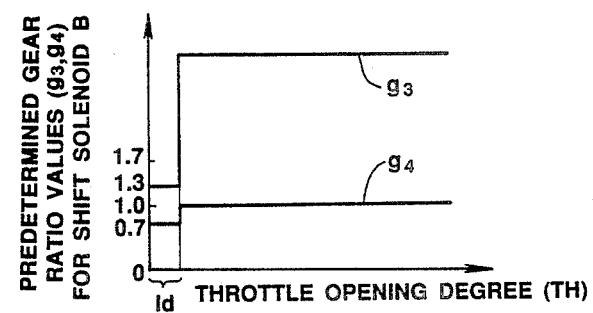

Following this, at step 43 data of the nature depicted in FIGS. 5(a) (viz., 1-2 shift table) and FIG. 7(a) (viz., 1-4 shift table) is used to determine, based on the instant throttle position (TH) and idle switch data (Id), gear ratio valves g1 and g2 which should be used in connection with decisions relating to the setting of the shift control solenoid A. The data used in FIGS. 5(b) and 7(b) is used to determine the corresponding values g3 and g4 which are used in connection with the setting of the shift control solenoid B. Viz., these gear ratio values are used as control limits and are compared with the instant value of G in order to determine in which manner the solenoids A and B should be conditioned (viz., switched ON and OFF).

It should be noted that the data which is displayed in FIG. 7(a) and 7(b) is used in the case that it is indicated (at steps 31, 32 & 33) that the instant speed gear ratio should be upshifted from first to fourth (for example) and is arranged in a manner to break a 1-4 shift into 1-3 and 3-4 stages. That is to say, the separation of the g1 and g2 values in the illustrated manner enables a double toggling of the solenoids, e.g. ON-OFF-ON. This smooths the shift by creating a temporary intermediate third speed stage. When a milder shift is indicated as being necessary, the data depicted in FIGS. 5(a) and 5(b) is used. As will be noted, the g1, g2 and g3, g4 traces in these figures overlap one another and exhibit no separation.

In response to the routine entering step 35, the sub-routine shown in FIG. 4 is run. This routine controls the ON-OFF setting of the solenoids A and B. At step 51, it is determined if an upshift is required or not. In the case that an upshift (viz., power ON upshift) is required, then at steps 52 and 53, the instant value of G is ranged against the instant values of g1 and g2. In the event that G>g1 then at step 54 solenoid A is conditioned to assume the pre-shift state (determined in step 41). If G is less than or equal to g1 or greater than g2 then at step 55 the state of solenoid A is toggled to assume the reverse of its pre-shift status.

However, if the outcome of both of steps 52 and 53 is positive, then the routine flows to step 56 wherein the state of solenoid A is set to assume the post-shift status.

Following this, at steps 57 to 61, G is similarly ranged against the values of g3 and g4 in order to determine the state to which solenoid B should be conditioned.

On the other hand, if the outcome of step 51 is such as to indicate that an upshift is not required (viz., a downshift is possibly required) the routine flows across to steps 62 to 71 wherein G is ranged against g1 & g2 and g3 & g4 in the indicated manner, and wherein the toggling to the post-shift or retention of the pre-shift states of the shift control solenoids A and B are determined.

Step 30 of the routine shown in FIG. 2 is such as to implement the solenoid state settings which are determined by the FIG. 4 sub-routine.

At the above mentioned step 33, in the event that a power OFF upshift is indicated as being necessary, the routine flows to steps 25 and 26.

At step 25 a table look-up of the essentially and indentical nature of the sub-routine executed at step 34 (see FIG. 3), is carried out. The only difference comes in that the data of the nature depicted in FIGS. 6(a) and 6(b) (viz., data which is recorded in terms of vehicle speed (V) is used in place of that which is recorded in terms of throttle opening.

At step 35 a sub-routine of the nature shown in the flow chart of FIG. 4, is used. However, in this instance steps 51 to 71 are omitted as the routine has flown through steps 32 and 33 and the possibility of the need for a downshift has been eliminated. Accordingly, this sub-routine consists only of steps 52 to 61 wherein G is ranged against the g1-g4 values in order to determine if the states of the solenoids should be toggled or not.

Upon completion of this sub-routine, the program flows to step 30 wherein the solenoid states are set and subsequently implemented.

With the above described power ON and power OFF upshift control, the appropriate shift selection between first, second, third and fourth forward speeds is automatically made according to the shift patterns shown in FIGS. 5-7. Further, when driving conditions change the appropriate changes are automatically reflected in the control values. Accordingly, during shifting, the values of G, g1, g2, g3 and g4 are readily derived it is possible to synchronize the rotational speeds of the input and output shafts of the transmission by keeping in mind the gear ratio which will be produced after the shift is completed, and therefore greatly minimize the generation of shift shock.

What is claimed is:

1. In a vehicle
a vehicle speed sensor;
an engine, said engine having a throttle valve;
a throttle position sensor for sensing the position of said throttle valve;
an idle switch for sensing the closure of said throttle valve;
a power train, said power train being operatively connected between said engine and the driving wheels of said vehicle, said power train including a transmission comprising:
an input shaft and an output shaft, said input and output shafts being operatively connected by a gear train which is controlled by a plurality of friction elements;
first and second rotational speed sensors for sensing the rotational speeds of said input and output shafts, respectively;
a gear train control valve unit, said control valve unit having first and second solenoids, said solenoids each having an ON and an OFF state said first and second solenoids controlling the movement of valves which control the supply of hydraulic fluid to the plurality of friction elements of said transmission;
a shift control unit, said shift control unit being operatively connected with said control valve unit in a manner to control said first and second solenoids, said shift control unit being responsive to said vehicle speed sensor, said throttle valve sensor, said idle switch and said first and second rotational speed sensors, said shift control unit including a memory in which a plurality of control schedules for each of said first and second solenoids are recorded some of said control schedules stored in terms of gear ratio limits and throttle opening degree and some of said control schedules stored in terms of gear ratio limits and vehicle speed,
said shift control unit including circuit means for deriving a rotational speed ratio based on the inputs from said first and second rotational speed sensors and comparing the derived rotational speed ratio with the gear ratio limits which are read out of memory based on the input from said vehicle speed sensor, said shift control unit being arranged to selectively switch said first and second solenoids between one of a continuously ON state and a continuously OFF state in accordance with the outcome of the comparison of said ratio with said gear ratio limits.

2. In an automatic transmission which is operatively connected with an engine having a load sensor, and which includes a vehicle speed sensor:
first and second shift control solenoids;
first and second rotational speed sensors for sensing the sensing the rotational speed of an input and an output shaft of said transmission;
a memory in which data is recorded, said data including a power off shift control schedule which is recorded in terms of vehicle speed and gear ratio limits and a power on shift control schedule which is recorded in terms of engine load and gear ratio limits; and
means for:
determining the load on the engine from the output of said load sensor;
determining the vehicle speed from the output of said vehicle sensor;
determining based on the engine load and vehicle speed if the shift is required;
comparing the input and output rotational speeds and developing a ratio;
comparing the ratio with first and second gear ratio limits specified by said power off shift control schedule for determining the energization mode of said first shift control solenoid in the event that the load on the engine is below a predetermined limit;
comparing the ratio with first and second gear ratio limits specified by said power on shift control schedule for determining the energization modes of said first shift control solenoid in the event that the load on the engine is above the predetermined limit;
comparing the ratio with third and fourth limits specified by said power off shift control schedule for determining the energization mode of said second shift control solenoid in the event that the load on the engine is below a predetermined limit;
comparing the ratio with third and fourth gear limits specified by said power on shift control schedule for determining the energization mode of said second shift control solenoid in the event that the load on the engine is above the predetermined limit;
setting the solenoid energization status of said first solenoid to one of continuous energization and continuous de-energization in accordance with the comparison of said ratio with the first and second limits specified by the selected one of the power off shift control schedules; and
setting the solenoid energization status of said second solenoid to one of continuous energization and continuous de-energization in accordance with the comparison of said ratio with the third and fourth limits specified by the selected one of the power on and power off shift control schedules.

3. In a vehicle
a vehicle speed sensor
an engine, said engine having a throttle valve;
a throttle position sensor for sensing the position of said throttle valve;
a power train, said power train being operatively connected between said engine and the driving wheels of said vehicle, said power train including a transmission comprising:
an input shaft and an output shaft;

first and second rotational speed sensors for sensing the rotational speeds of said input and output shafts, respectively;

a gear train control valve unit, said control valve unit having first and second solenoids, said solenoids each having an ON and an OFF state;

first and second power off energization control schedules for each of said first and second solenoids, said first and second power off control schedules being recorded in terms of gear ratio limits and vehicle speed;

first and second power on energization control schedules for each of said first and second solenoids, said first and second power on energization control schedules being recorded in terms of gear ratio limits and engine load;

a shift control unit, said shift control unit being operatively connected with said control valve unit in a manner to control said first and second solenoids, said shift control unit being responsive to said vehicle speed sensor, said throttle valve sensor, and said first and second rotational speed sensors, said shift control unit including a memory in which said first and second power off energization control schedules and said first and second power on energization control schedules are stored, said shift control unit including circuit means for selecting said first and second power off energization control schedules from the memory in the event that the load on the engine is indicated as being below a predetermined level by said throttle position sensor, selecting said first and second power on energization control schedules from the memory in the event that the load on the engine is indicated as being above the predetermined level by said throttle position sensor, deriving a rotational speed ratio based on the inputs from said first and second rotational speed sensors and comparing the derived rotational speed ratio with the gear ratio limits which are specified in the energization control schedules which are selected respect to engine load, said shift control unit being arranged to one of continuously energizing and continuously de-energizing said first and second solenoids in accordance with the outcome of the comparison of said ratio with the gear ratio limits specified in the selected energization control schedules.

4. In a vehicle a vehicle speed sensor;
an engine;
an engine load sensor;
a transmission, said transmission including:
an input shaft operatively connected with said engine;
an output shaft;
a gear train which operatively interconnects said input and output shafts and which is controlled by a plurality of friction elements, said friction elements being arranged such that selective engagement thereof produces four forward speeds; and
a transmission control system comprising:
a source of line pressure;
a source of essentially constant pilot pressure;
first and second shift valves for selectively controlling the supply of line pressure to the friction elements, said first and second shift valves having control chambers into which pilot pressure is selectively admissible;

first and second shift control solenoids which are arranged to be selectively switched from a first continuously maintained energization state to a second continuously maintained energization state in order to implement a shift between forward speeds of the transmission, said first and second shift control solenoids controlling the admission of pilot pressure into said control chambers;

shift determining means responsive to said engine load sensor and said vehicle speed sensor for determining when and what kind of shift is required;

means for determining a ratio representative of the rotational speeds of the transmission input and output shafts; and means responsive to said shift determining means and said ratio determining means for controlling said first and second shift control solenoids, said control means including power off solenoid control schedules which are recorded in terms of said ratio and vehicle speed and power on shift control schedules which are recorded in terms of said ratio and engine load, said controlling means using the power off solenoid control schedules when the engine load is at and below a predetermined level, and using said power on solenoid control schedules when the engine load is above said predetermined level.

5. In an automatic transmission which is operatively connected with an engine having a load sensor, and which includes a vehicle speed sensor:

first and second shift control solenoids;
first and second rotational speed sensors for sensing the rotational speed of an input and an output shaft of said transmission;
a memory in which data is recorded, said data including a power off shift control schedule which is recorded in terms of vehicle speed and gear ratio limits; and
means for:
determining the load on the engine from the output of said load sensor;
determining the vehicle speed from the output of said vehicle sensor;
determining based on the engine load and vehicle speed, if a shift is required;
comparing the input and output rotational speeds and developing a ratio;
comparing the ratio with first and second gear ratio limits specified by said power off shift control schedule for determining the energization mode of said first shift control solenoid in the event that the load on the engine is below a predetermined limit;
comparing the ratio with third and fourth limits specified by said power off shift control schedule for determining the energization mode of said second shift control solenoid in the event that the load on the engine is below a predetermined limit;
setting the solenoid energization status of said first solenoid to one of continuous energization and continuous de-energization in accordance with the comparison of said ratio with the first and second limits specified by the power off shift control schedule; and
setting the solenoid energization status of said second solenoid to one of continuous energization and continuous de-energization in accordance with the comparison of said ratio with the third and fourth limits specified by the power off shift control schedule.

6. In a vehicle
a vehicle speed sensor;
an engine, said engine having a throttle valve;
a throttle position sensor for sensing the position of said throttle valve;
a power train, said power train being operatively connected between said engine and the driving wheels of said vehicle, said power train including a transmission comprising:
an input shaft and an output shaft;
first and second rotational speed sensors for sensing the rotational speeds of said input and output shafts, respectively;
a gear train control valve unit, said control valve unit having first and second solenoids;
first and second power off energization control schedules for said first and second solenoids, respectively, said first and second power off control schedules being recorded in terms of gear ratio limits and vehicle speed;
a shift control unit, said shift control unit being operatively connected with said control valve unit in a manner to control said first and second solenoids, said shift control unit being responsive to said vehicle speed sensor, said throttle valve sensor, and said first and second rotational speed sensors, said shift control unit including a memory in which said first and second power off energization control schedules are stored, said shift control unit including circuit means for selecting said first and second power off energization control schedules from the memory in the event that the load on the engine is indicated as being below a predetermined level by said throttle position sensor, deriving a rotational speed ratio based on the inputs from said first and second rotational speed sensors and comparing the derived rotational speed ratio with the gear ratio limits which are specified in the power off energization control schedule, said shift control unit being arranged to one of continuously energize and continuously de-energize each of said first and second solenoids selectively, in accordance with the outcome of the comparison of said ratio with the gear ratio limits specified in the first and second power off energization control schedules.

* * * * *